United States Patent [19]

Chess

[11] Patent Number: 4,848,530
[45] Date of Patent: Jul. 18, 1989

[54] TRANSMISSION CONTROL PROVIDING SEQUENTIALLY ENGAGED HIGH AND LOW SPEED CLUTCHES

[75] Inventor: Robert L. Chess, Troutdale, Oreg.

[73] Assignee: Hyster Company, Portland, Oreg.

[21] Appl. No.: 241,326

[22] Filed: Sep. 6, 1988

[51] Int. Cl.[4] .............................................. F16D 25/11
[52] U.S. Cl. ................................... 192/3.58; 192/4 C;
 192/51; 192/87.19
[58] Field of Search .................... 192/3.58, 4 C, 87.19,
 192/87.13, 87.18, 51, 3.57

[56] References Cited

U.S. PATENT DOCUMENTS

| 3,339,672 | 9/1967 | Crandall | 192/87.13 X |
| 3,882,980 | 5/1975 | Blake | 192/3.57 |
| 4,090,414 | 5/1978 | White | 74/733 |
| 4,574,661 | 3/1986 | Opperud et al. | 74/878 X |
| 4,601,369 | 7/1986 | Hattori et al. | 192/3.58 |
| 4,768,636 | 9/1988 | Ito et al. | 192/4 C X |

Primary Examiner—Rodney H. Bonck
Attorney, Agent, or Firm—Tim A. Long

[57] ABSTRACT

A clutch control for a multi-speed vehicle transmission having operator selected, hydraulically operatable clutches for the shifting of direction and speed includes a valve means which automatically engages a higher and a lower speed clutch in sequence when a direction shift is made. If the direction is shifted while the transmission is shifted to a lower speed range the next higher speed clutch will be momentarily engaged before the lower speed clutch is engaged.

4 Claims, 3 Drawing Sheets

TRANSMISSION CONTROL PROVIDING SEQUENTIALLY ENGAGED HIGH AND LOW SPEED CLUTCHES

BACKGROUND OF THE INVENTION (1) Field of the Invention

This invention relates to a power transmission for a shuttle type vehicle having a plurality of hydraulically and selectively engaged clutches for the changing of direction and speed range and, more particularly, to a control for transmission clutches which, when a direction change is made, causes a higher speed range clutch to automatically and momentarily engage before the operator selected lower speed range clutch engages.

(2) Description of the Related Art

Powershift transmissions in which a torque convertor couples the transmission to the engine and the speed range and direction are controlled by the operator's selective engagement of a plurality of friction clutches are well known in the art. Since the transmission gears are continuously engaged it is not necessary for the vehicle to stop before the operator selects a change in direction. Power reversal, shifting the transmission direction control while the vehicle is moving, is a common feature of the operation of shuttle type vehicles, such as fork lift trucks. In a power reversal, the energy of the moving vehicle is absorbed in the drive train primarily as heat, due to slippage, in the engaging clutch. Powershift transmissions commonly include a means to control the rate of clutch engagement to permit the clutch to slip; smoothing the deceleration of the vehicle and limiting the torque developed in the drive train during a power reversal.

For lighter vehicles and slower speeds, slippage of a single clutch is usually adequate to absorb the energy of the moving vehicle. However, with heavier vehicles, higher speeds and greater frequency of power reversal larger, more expensive clutches are required to withstand the thermal load of power reversals. The higher gear ratios, common in the lower speed ranges of heavy vehicles, also make it difficult to control clutch engagement to avoid excessive drive train torque during a power reversal while maintaining a short delay time for smooth transmission performance.

SUMMARY OF THE INVENTION

The present invention provides a clutch engagement control system for a powershift transmission. If the direction control for the transmission is shifted by the operator while the transmission is in a lower speed range, the clutch, for the new direction in the next higher speed range than that selected by the operator, is momentarily engaged. After a predetermined time, the higher speed clutch is disengaged as engagement of the lower speed clutch is initiated. The lower speed clutch reaches full engagement as the vehicle stops. The energy of the moving vehicle is first absorbed by the higher speed clutch and then by the lower speed clutch, substantially reducing the thermal load on the lower speed clutch. Likewise, absorbing part of the vehicle's energy with the higher speed clutch permits more rapid engagement of the lower speed clutch without generating excessively high drive train torque.

BRIEF DESCRIPTION OF THE DRAWINGS

The invention is described below with reference to the accompanying drawings where.

DESCRIPTION OF THE PREFERRED EMBODIMENT

Figure 1:
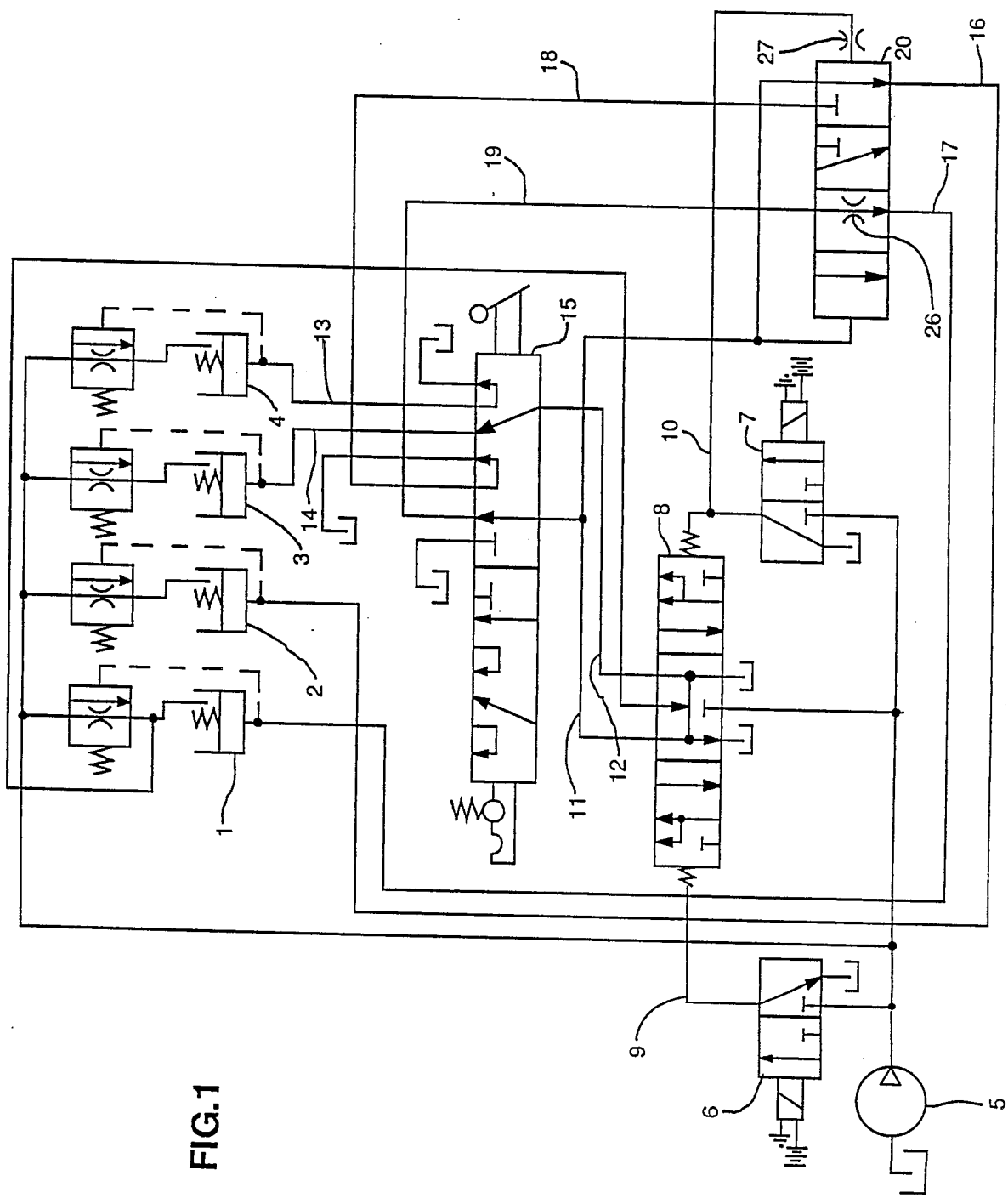
FIG. 1 is a schematic circuit diagram of a hydraulic clutch control for a powershift transmission according to the present invention.

A hydraulic clutch control circuit for a two speed powershift transmission incorporating the present invention is schematically illustrated in FIG. 1. While sequential engagement of the high and low speed clutches could be accomplished when shifting to either direction, the most severe power reversal is likely to occur when the vehicle is traveling in reverse and is shifted to forward. For this reason and for simplicity of explanation, the sequential engagement of clutches and the clutch sequencer valve are described as applied only when shifting from reverse to forward-low speed.

The transmission has a high and low speed range in both the forward and reverse directions controlled by selectively engaged, hydraulically operated friction clutches. The clutches, not shown, are conventional; comprising a plurality of clutch disks attached, alternately, to the a housing or a clutch shaft and a hydraulic actuator which forces the clutch disks together when fluid pressure is applied, increasing the friction between the disks to engage the clutch. There is a clutch actuator corresponding to each clutch: forward-low 1, forward-high 2, reverse-low 3 and reverse-high 4.

Hydraulic fluid pressurized by a pump 5 flows to a forward solenoid valve 6, a reverse solenoid valve 7, and a forward-reverse valve 8. The operator of the vehicle, by actuation of an electrical switch, not shown, can energize either the forward or reverse solenoid valve. Pressurized fluid will be directed through a forward pilot passageway 9 if the forward solenoid valve is energized or a reverse pilot passageway 10 if the reverse solenoid valve is energized. When the either forward or reverse solenoid valve is not energized, fluid in the respective forward or reverse pilot passageway is permitted to drain. The forward-reverse valve 8 will be shifted from its centered, neutral, position in response to the presence of pressure in the forward or reverse pilot passageway; 9 or 10, enabling the communication of fluid to a passageway leading either to the forward clutch actuators or the reverse clutch actuators; a forward passageway 11 or a reverse passageway 12.

A high-low range valve 15, in response to the operator's movement of a control lever, directs fluid in the forward passageway to either the forward-high passageway 18 or the forward-low passageway 19 and connects the other to drain. Likewise, fluid in the reverse passageway 12 is communicated to either a reverse-high passageway 13 or a reverse-low passageway 14. As it is illustrated in FIG. 1, the high-low range valve will direct fluid in the reverse passageway through the reverse-low passageway 14 to the reverse-low clutch actuator 3. If the operator shifts the high-low range valve, by operation to the appropriate control lever, fluid will be directed to the reverse-high clutch passageway 13 engaging the reverse-high clutch. This action will connect the reverse-low passageway to the drain; disengaging the reverse-low clutch.

Figure 2:
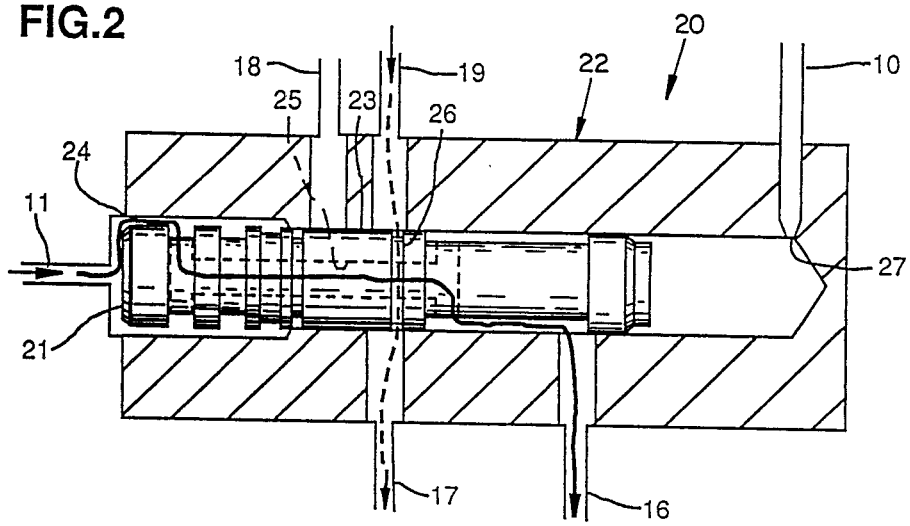
FIG. 2 is a sectional view of a clutch sequencer valve with the valve spool shifted to a first position.
Figure 3:
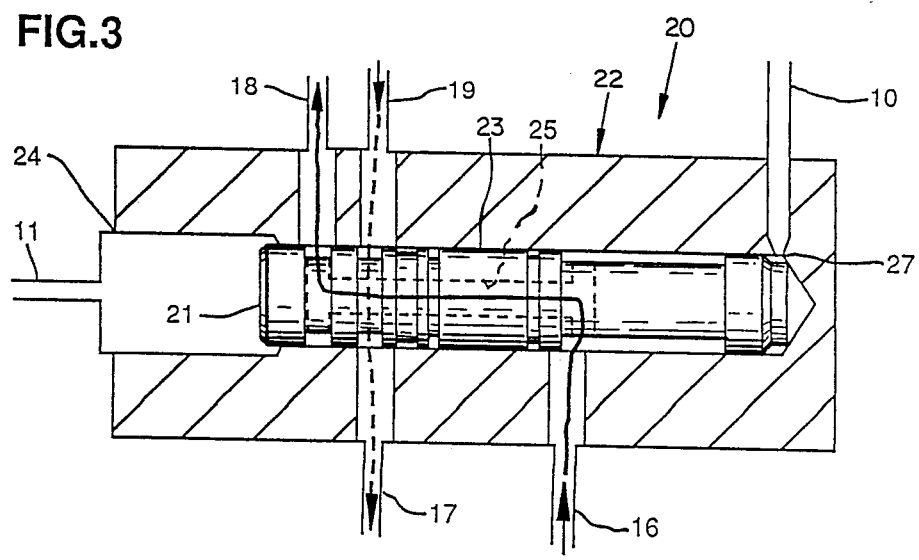
FIG. 3 is a sectional view, similar to FIG. 2, but showing the valve spool shifted to a second position.

When the forward-reverse valve is shifted to the forward position, pressurized fluid will be directed to the forward passageway 11 and will be communicated to the high-low range valve 15 and the clutch sequencer valve 20. The clutch sequencer valve, as illustrated in FIGS. 2 and 3, comprises a valve spool 21 having a central bore 25 and slidably disposed in a stepped bore, having a first portion 23 with a close fitting diameter and a second portion 24 of a larger diameter, in a valve body 22. The valve spool is pilot operated by pressure in either the reverse pilot or forward passageways. Pressurized fluid in the reverse pilot passageway 10 provides a signal that the transmission is shifted to reverse and shifts the valve spool to a first position, illustrated in FIG. 2. When the valve spool is in the first position the forward-high passageway 18, from the high-low range valve, is blocked. However, the forward passageway 11 is in communication, through the enlarged bore 24 in the valve body 22 and bore 25 in the valve spool, with the forward-high clutch passageway 16 leading to the forward-high clutch actuator 2. The forward-low passageway 19 from the high-low range valve is also connected to the forward-low clutch passageway 17 through orifice 26 when the valve spool is in the first position. Orifice 26 permits the forward-low clutch actuator 1 to drain and the clutch to disengage when the clutch sequencer valve spool is in the first position. However, fluid flow through the orifice is restricted and the orifice is sized to prevent the flow of a sufficient volume to the forward-low clutch actuator to engage the clutch before the valve spool shifts from the first position. In effect, flow to the forward-low clutch actuator is blocked until the clutch sequencer valve spool shifts.

The presence of pressurized fluid in the forward passageway provides the signal that the direction has been shifted and urges the spool of the clutch sequencer valve to shift to a second position, as illustrated in FIG. 3. However, the flow of fluid from the clutch sequencer valve into the reverse pilot passageway is restricted by an orifice 27 and the time required for the clutch sequencer valve spool to shift to the second position can be established by the sizing of the orifice 27. When the clutch sequencer valve spool shifts to the second position, fluid communication from the forward passageway 11 to the forward-high clutch passageway 16 will be blocked, but the forward-high clutch passageway 16 will be connected to the forward-high passageway 18. The forward-low passageway 19 will be connected to the forward-low clutch passageway 17. The position of the high-low range valve will determine whether the forward-low or forward-high clutch will engage when the clutch sequencer valve spool shifts to the second position.

MODE OF OPERATION

To travel in reverse, the reverse solenoid valve 7 is energized and pressurized fluid will be present in the reverse pilot passageway 10. Fluid in the reverse pilot passageway signals the change of direction and shifts the clutch sequencer valve spool 21 to the first position, as illustrated in FIG. 2. Fluid will pass through the forward reverse valve 8 and the high-low range valve 15. Either the reverse-high or reverse-low clutch will be engaged. The remaining clutch actuators are connected to the drain and the clutches are disengaged.

Figure 4:
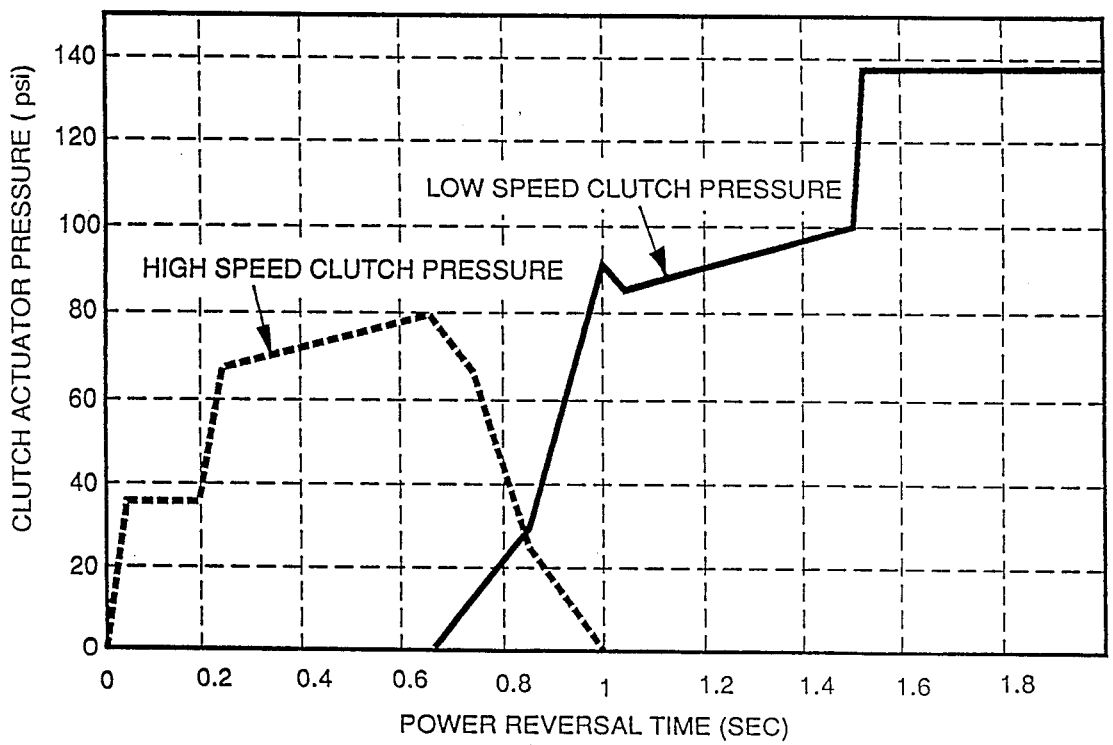
FIG. 4 is a graph of the high and low speed clutch actuator pressure versus time during a power reversal to the low speed range; and, FIG. 5 is a graph of axle torque versus time during a power reversal to the low speed range.

When the operator shifts the transmission to forward, the forward-reverse valve will be shifted to the forward position, by the energizing of the forward solenoid valve 6, directing fluid to the forward passageway. The reverse clutch which had been engaged will be connected to drain through the forward-reverse valve and will disengage. Fluid in the forward passageway will flow through the bore 25 in the clutch sequencer valve spool and pressurize the high speed clutch actuator for forward travel, as illustrated in FIG. 4. The forward-low passageway 19 will also be connected to the forward-low clutch passageway 17 through orifice 26. Any flow from the high-low range valve through the clutch sequencer valve to the forward-low clutch actuator will be resisted by the presence of orifice 26 in the clutch sequencer valve. The size of orifice 26 is such that there will be insufficient volume flowing through the orifice to cause engagement of the forward-low clutch while the clutch sequencer valve is in the first position and, in effect, flow to the clutch is blocked until the clutch sequencer valve shifts. The pressure of fluid in the forward passageway will also urge the spool of the clutch sequencer valve toward the second position, illustrated in FIG. 3. The shifting of the clutch sequencer valve spool will be delayed by the resistance which the orifice 27 poses to the flow of fluid from the clutch sequencer valve bore 23 to the reverse pilot passageway 10 which has been connected to drain by the deenergizing of the reverse solenoid valve.

When the spool of the clutch sequencer valve has shifted to the second position, see FIG. 3, the forward-high clutch passageway 16 will be in communication, through the bore 25 in the clutch sequencer valve spool, with the forward-high passageway 18 from the high-low range valve. The forward-low passageway 19 will be connected to the forward-low clutch passageway 17. While fluid communication is enabled to both the high and low speed clutches, the position of the high-low range valve, as selected by the operator, will now determine which clutch is engaged.

If the transmission had been shifted to high when the shift to forward occurred pressure would continue to increase in the forward-high clutch actuator and engagement would be maintained.

If the transmission is shifted to low range when it is shifted to forward the forward-high clutch actuator will be connected to drain through the high-low range valve and will disengage when the clutch sequencer valve spool shifts to the second position. The forward-low clutch actuator 1 will be connected to fluid pressure in the forward-low passageway 19 through the clutch sequencer valve and the forward-low clutch will engage. As illustrated in FIG. 4, the pressure in the high speed clutch actuator will be released and the low speed clutch actuator will be pressurized.

Figure 5:
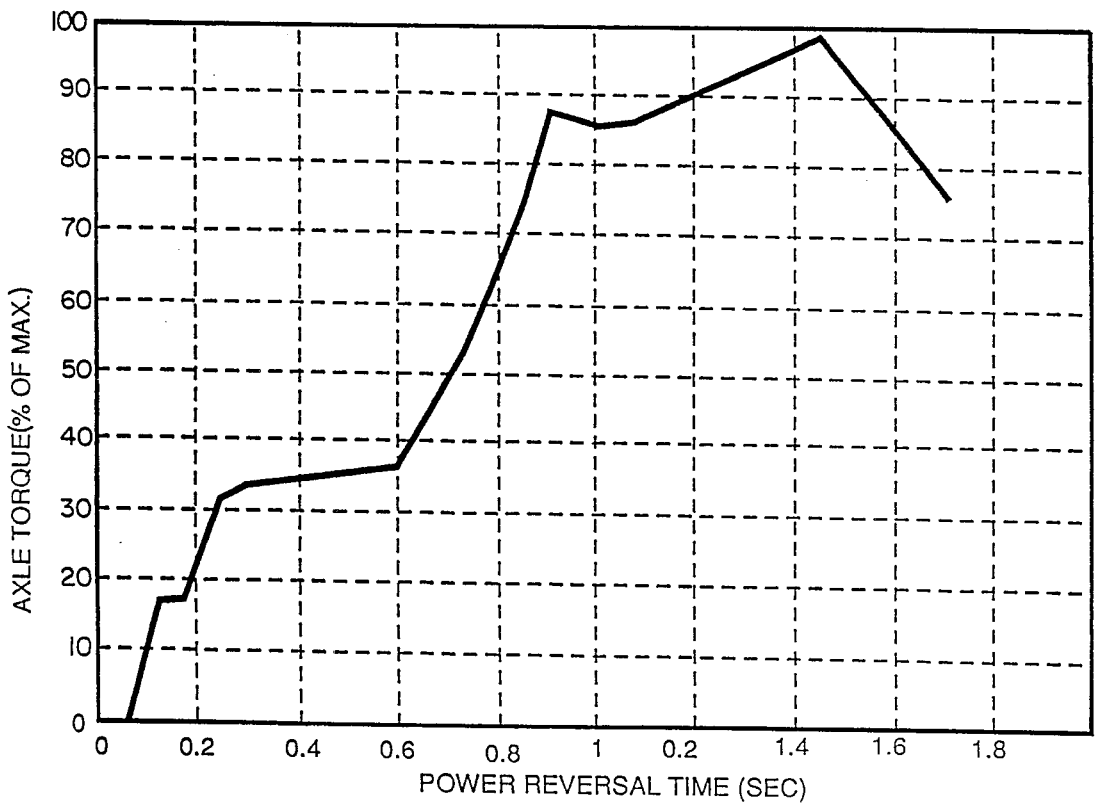

Vehicle axle torque, as shown in FIG. 5, increases as the pressure in the forward-high clutch actuator increases and the forward-high clutch is momentarily engaged. The forward-high clutch initially absorbs energy as the vehicle decelerates. After a period of time pressure in the forward-high clutch is released and the clutch disengages. However, the forward-low clutch actuator pressure increases and the torque exerted on the vehicle axle increases as the forward-low clutch absorbs the remainder of the vehicle's energy and brings it to a stop.

When the vehicle is next shifted to reverse, pressure in the reverse pilot passageway 10 will shift the spool of the clutch sequencer valve to the first position in preparation for the next shift to forward.

Although a specific embodiment of the invention has been shown and described, various changes and alteration might be made without departing from the spirit or broader aspects of the invention as set forth in the claims.

What is claimed is:

1. In a vehicle transmission having a higher speed range and a lower speed range operable by the selective engagement of friction clutches, a clutch engagement control which comprises: means, responsive to a change in direction, to automatically and momentarily engage a higher speed range clutch before the engagement of an operator selected lower speed range clutch.

2. A clutch control system for a vehicle transmission operable in a higher speed range and a lower speed range by the selective engagement of friction clutches, comprising:
   (a) means for the vehicle operator to select engagement of clutches for forward or reverse operation,
   (b) means for the operator to select engagement of either a higher speed clutch or a lower speed clutch, and;
   (c) means responsive to a change in the selected direction of operation to automatically and momentarily engage a higher speed clutch before engagement of an operator selected lower speed clutch.

3. In a vehicle transmission having a hydraulically operable fiction clutch for each of a higher and lower speed, a clutch control system to automatically and momentarily engage a higher speed clutch before the engagement of an operator selected lower speed clutch, which comprises:
   (a) a pump supplying pressurized fluid to,
   (b) a forward-reverse valve means to selectively establish fluid communication for either forward or reverse operation,
   (c) a high-low valve, in communication with the forward-reverse valve means, selectively operable to a first position establishing fluid communication with a first fluid passageway leading to a higher speed clutch and draining a second passageway leading to a lower speed clutch and a second position establishing fluid communication with the second passageway and draining the first passageway, and;
   (d) a clutch sequencer valve having a first position permitting fluid communication to the higher speed clutch and blocking fluid communication with the lower speed clutch and, in delayed response to a signal of direction change, shifting to a second position enabling fluid communication from the high-low valve through the first and second passageways to both the higher speed clutch and the lower speed clutch.

4. The clutch control system of claim 3, further comprising; a means, responsive to a direction change signal, to automatically return the clutch sequencer valve to the first position.

* * * * *